US011832001B2

(12) United States Patent
Kuo et al.

(10) Patent No.: US 11,832,001 B2
(45) Date of Patent: Nov. 28, 2023

(54) IMAGE PROCESSING METHOD AND IMAGE PROCESSING SYSTEM (71) Applicant: VisEra Technologies Company Limited, Hsin-Chu (TW)

(72) Inventors: Shin-Hong Kuo, Hsin-Chu (TW); Yu-Chi Chang, Hsin-Chu (TW)

(73) Assignee: VISERA TECHNOLOGIES COMPANY LIMITED, Hsin-Chu (TW)

(*) Notice: Subject to any disclaimer, the term of this patent is extended or adjusted under 35 U.S.C. 154(b) by 55 days.

(21) Appl. No.: 17/555,676

(22) Filed: Dec. 20, 2021

(65) Prior Publication Data
US 2023/0199325 A1 Jun. 22, 2023

(51) Int. Cl.
*H04N 23/80* (2023.01)
*G06T 7/557* (2017.01)
*G06T 5/00* (2006.01)

(52) U.S. Cl.
CPC ............. *H04N 23/80* (2023.01); *G06T 5/003* (2013.01); *G06T 5/006* (2013.01); *G06T 7/557* (2017.01)

(58) Field of Classification Search
CPC ......... H04N 23/80; G06T 5/003; G06T 5/006; G06T 7/557
See application file for complete search history.

(56) References Cited

U.S. PATENT DOCUMENTS

| 9,057,931 B1 | 6/2015 | Baldwin |
| 2012/0019688 A1 | 1/2012 | Bugnariu et al. |
| 2014/0168471 A1* | 6/2014 | Lay ............ H04N 23/631 348/231.99 |
| 2014/0218593 A1* | 8/2014 | Yamada .......... H04N 23/743 348/349 |
| 2016/0133762 A1* | 5/2016 | Blasco Claret ... H04N 25/134 438/69 |
| 2017/0365045 A1 | 12/2017 | Mocanu et al. |
| 2020/0099836 A1 | 3/2020 | Chao |
| 2020/0195837 A1 | 6/2020 | Miu et al. |
| 2021/0360154 A1 | 11/2021 | Slobodin |
| 2023/0091313 A1* | 3/2023 | Wu ............... G06T 5/50 345/419 |

FOREIGN PATENT DOCUMENTS

| CN | 109379454 | 2/2019 |
| CN | 107967946 B | 5/2021 |
| CN | 110060215 B | 9/2021 |

(Continued)

OTHER PUBLICATIONS

Office Action and Search Report of corresponding TW Application No. 111121005 dated Sep. 22, 2022, 12 pages.

(Continued)

*Primary Examiner* — Christopher K Peterson (74) *Attorney, Agent, or Firm* — MUNCY, GEISSLER, OLDS & LOWE, P.C.

(57) ABSTRACT

The present invention provides an image processing method, including: obtaining a first image using a camera under a display screen; processing the first image using a processor; obtaining a second image using the camera under the display screen; processing the second image using the processor; and generating a superimposed image after superimposing the first sub-image and the second sub-image.

20 Claims, 10 Drawing Sheets

(56) References Cited

FOREIGN PATENT DOCUMENTS

| | | |
|---|---|---|
| CN | 113645422 | 11/2021 |
| JP | 2012-189708 | 10/2012 |
| JP | 2015-520992 A | 7/2015 |
| JP | 2018-037998 A | 3/2018 |
| JP | 2018-107614 | 7/2018 |
| KR | 10-2016-0121569 A | 10/2016 |
| TW | 201925860 A | 7/2019 |
| TW | 1691932 B | 4/2020 |

OTHER PUBLICATIONS

Search Report of corresponding EP Application No. 22165113.6 dated Oct. 11, 2022, 12 pages.

* cited by examiner

IMAGE PROCESSING METHOD AND IMAGE PROCESSING SYSTEM

BACKGROUND OF THE INVENTION

Field of the Invention

The present invention is related in general to image processing methods and image processing systems. In particular it is related to image processing methods and image processing systems capable of generating clear images.

Description of the Related Art

A camera disposed under a display screen will need to integrate transparent display, image processing, and camera design technologies. However, there are significant problems associated with putting a display screen in front of a camera, such as haze, glare, and color cast.

The periodic slit structures of the display screen causes diffraction and interference when the light passes though the display, and these results in the images being overlaid and blurry. Furthermore, if the object photographed is far away from the camera, the diffraction effect is more pronounced, and the image of the object is much more blurry.

Therefore, image processing methods and image processing systems under display screens that can generate clear images is required.

BRIEF SUMMARY OF THE INVENTION

An embodiment of the present invention provides an image processing method, including: obtaining a first image using a camera under a display screen; processing the first image using a processor; obtaining a second image using the camera under the display screen; processing the second image using the processor; and generating a superimposed image after superimposing the first sub-image and the second sub-image. The step of processing the first image using a processor, including: determining a first sub-image of the first image and capturing the first sub-image from the first image, wherein the first sub-image is a sub-image of the first image that has a first depth. The step of processing the second image using the processor, including: determining a second sub-image of the second image and capturing the second sub-image from the second image, wherein the second sub-image is a sub-image of the second image that has a second depth; superimposing the first sub-image and the second sub-image. The first depth is different than the second depth.

In some embodiments, the step of determining the first sub-image includes: obtaining position informations and direction informations of the first image using a double-layer lens array CIS; determining a plurality of depths of a plurality of sub-images of the first image; and selecting the first depth and obtaining the first sub-image. The step of determining the second sub-image includes: obtaining position informations and direction informations of the second image using the double-layer lens array CIS; determining a plurality of depths of a plurality of sub-images of the second image; and selecting the second depth and obtaining the second sub-image. In some embodiments, the image processing method further includes: selecting the first sub-image and the second sub-image by a user before they are superimposing; and outputting the superimposed image after the superimposed image is generated. In some embodiments, the image processing method further includes: determining the clarity of the superimposed image using the processor. In some embodiments, the image processing method further includes: outputting the superimposed image in response to a determination that the superimposed image is clear. In some embodiments, the image processing method further includes: obtaining a third image using the camera under the display screen in response to a determination that the superimposed image is unclear. In some embodiments, the image processing method further includes: processing the third image using the processor. The step of processing the third image using the processor includes: determining a third sub-image of the third image and capturing the third sub-image from the third image using the processor, wherein the third sub-image has a third depth that is different from the first depth and the second depth. In some embodiments, the step of superimposing includes: superimposing the first sub-image, the second sub-image and the third sub-image. In some embodiments, the third depth is between the first depth and the second depth.

In addition, an embodiment of the present invention provides an image processing system, including a display screen, a double-layer lens array CIS, and a processor. The double-layer lens array CIS is disposed below the display screen, and is configured to receive a first light and a second light. In response to receiving the first light, the double-layer lens array CIS generates a first image. In response to receiving the second light, the double-layer lens array CIS generates a second image. The processor is configured to superimpose a first sub-image of the first image and a second sub-image of the second image to generate a superimposed image. The first sub-image is a sub-image of the first image that has a first depth. The second sub-image is a sub-image of the second image that has a second depth. The first depth is different than the second depth.

In some embodiments, the double-layer lens array CIS includes a first layer lens array, a second layer lens array, and a sensor. The first layer lens array includes a plurality of first layer lenses. The second layer lens array is disposed over the first layer lens array and includes a plurality of second layer lenses. The sensor includes a plurality of pixels. The size of each of the first layer lenses is equal to the size of each of the pixels. The size of each of the second layer lenses is greater than or equal to 3 times the size of each of the pixels. In some embodiments, the first light and the second light pass through the display screen, the second layer lens array and the first layer lens array and then reaches the sensor. An area of each one of the second layer lens is smaller than 30% of a sensing area of the sensor. In some embodiments, the arrangements between the first layer lens array and the second layer lens array may be in a triangle arrangement, a rectangle arrangement, a hexagon arrangement, or a polygon arrangement. In some embodiments, the first sub-image is captured from the first image by the processor, and the second sub-image is captured from the second image is captured by the processor for superimposing. In some embodiments, the clarity of the superimposed image is determined by the processor. In some embodiments, the double-layer lens array CIS receive a third light in response to a determination that the superimposed image is unclear. In response to receiving the third light, the double-layer lens array CIS generates a third image. The processor is configured to superimpose the first sub-image, the second sub-image and a third sub-image of the third image to generate a superimposed image. The third sub-image is a sub-image of the third image that has a third depth. The third depth is different than the first depth and the second depth. In some embodiments, the display screen outputs the superimposed image in response to a determination that the superimposed image is clear. In some embodiments, the third depth is between the first depth and the second depth. In some embodiments, the first sub-image and the second sub-image for superimposing are selected by a user. The display screen outputs the superimposed image. In some embodiments, the image of a first object is clear in the first image, and the image of a second object is clear in the second image. The image of the first object is not clear in the second image, and the image of the second object is not clear in the first image. The first object is the first depth away from the image processing system. The second object is the second depth away from the image processing system.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Furthermore, the shape, size, and thickness in the drawings may not be drawn to scale or simplified for clarity of discussion; rather, these drawings are merely intended for illustration.

Figure 1:
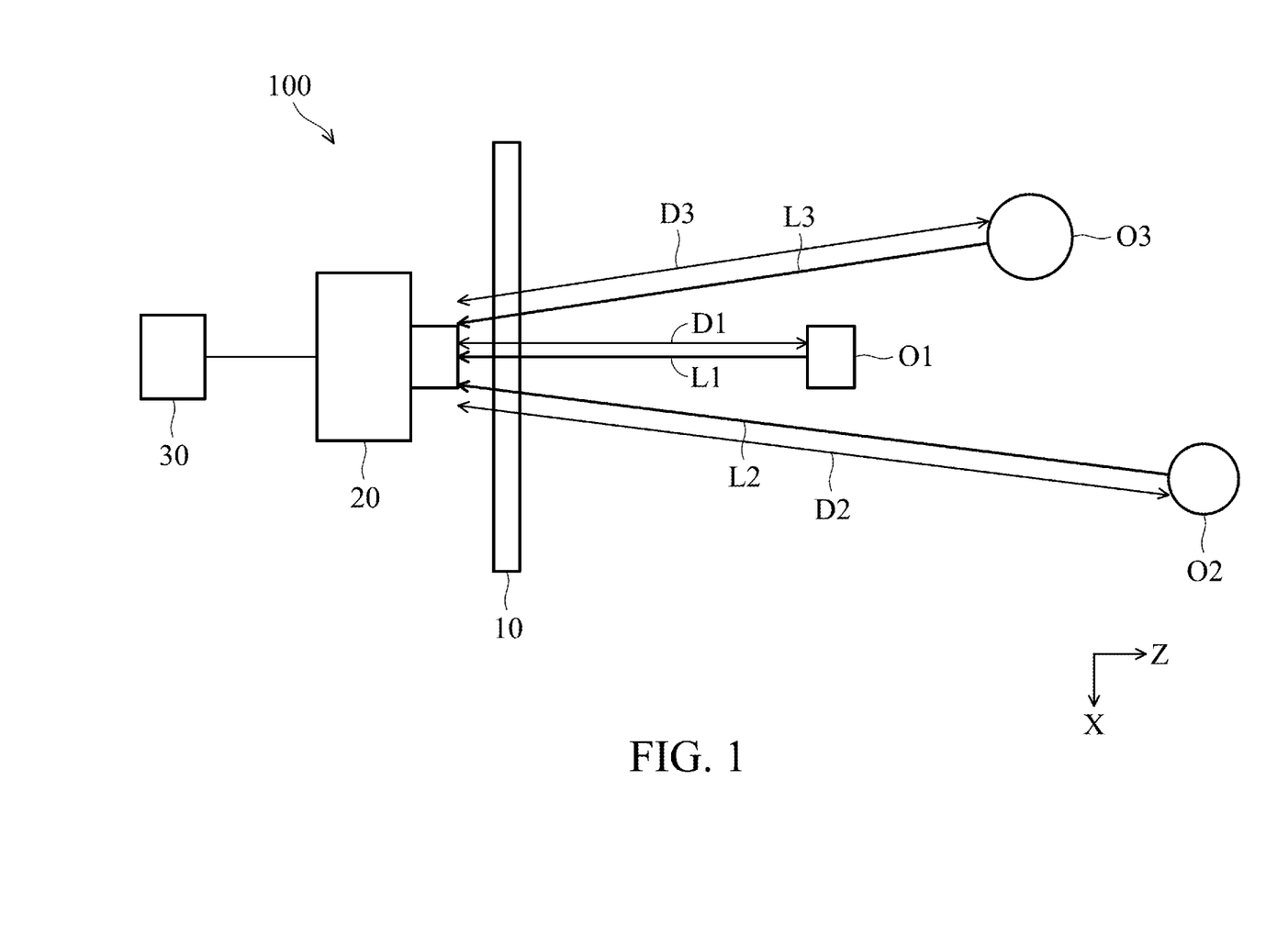
FIG. 1 shows a schematic view of an image processing system and a first object, a second object and a third object according to some embodiments of the present disclosure.

Please refer to FIG. 1, which shows a schematic view of an image processing system 100 and a first object O1, a second object O2 and a third object O3 according to some embodiments of the present disclosure. The image processing system 100 may be mounted in an electronic device, such as a smart phone, a tablet, a laptop, etc. The image processing system 100 may include a display screen 10, a double-layer lens array CIS 20 and a processor 30.

The double-layer lens array CIS 20 and the processor 30 may be collectively referred to as a camera. The double-layer lens array CIS 20 (or the camera) may be disposed below or under the display screen 10. The processor 30 may electrically connected to the double-layer lens array CIS 20, and the connection is indicated by the line connecting the double-layer lens array CIS 20 and the processor 30.

In some embodiments, the image processing system 100 may be a light field camera that is capable of getting the plenoptic function (POF) of lights that are incident to the image processing system 100. In some embodiments, the image processing system 100 may be a light field camera that is capable of getting a 4D plenoptic function (POF) for incident lights with different wavelengths.

The 4D plenoptic function may include the plane coordinates and the directions of the incident lights. In some embodiments, the plane coordinates may be the X and Y coordinates of the first object O1, the second object O2 and the third object O3, and they may be referred to as position information. In some embodiments, the horizontal angle and the vertical angle of the first object O1, the second object O2 and the third object O3 with respect to the image processing system 100, and they may be referred to as direction information. In other words, the image processing system 100 may acquire the plenoptic function of the lights incident from the e first object O1, the second object O2 and the third object O3.

As shown in FIG. 1, the first object O1 is distant from the image processing system 100. The distance between the image processing system 100 and the first object O1 is a first depth D1. The distance between the image processing system 100 and the second object O2 is a second depth D2. The distance between the image processing system 100 and the third object O3 is a third depth D3. In some embodiments, the first depth D1 is different than the second depth D2. In some embodiments, the third depth D3 is different than the first depth D1 or the second depth D2. In some embodiments, the third depth D3 is between the first depth D1 and the second depth D2.

As shown in FIG. 1, a first light L1 is incident from the first object O1 to the image processing system 100; a second light L2 is incident from the second object O2 to the image processing system 100; a third light L3 is incident from the third object O3 to the image processing system 100.

The image processing system 100 may receive the first light L1 and acquire the position information and the direction information of the first object O1. The image processing system 100 may receive the second light L2 and acquire the position information and the direction information of the second object O2. The image processing system 100 may receive the third light L3 and acquire the position information and the direction information of the third object O3.

Figure 2:
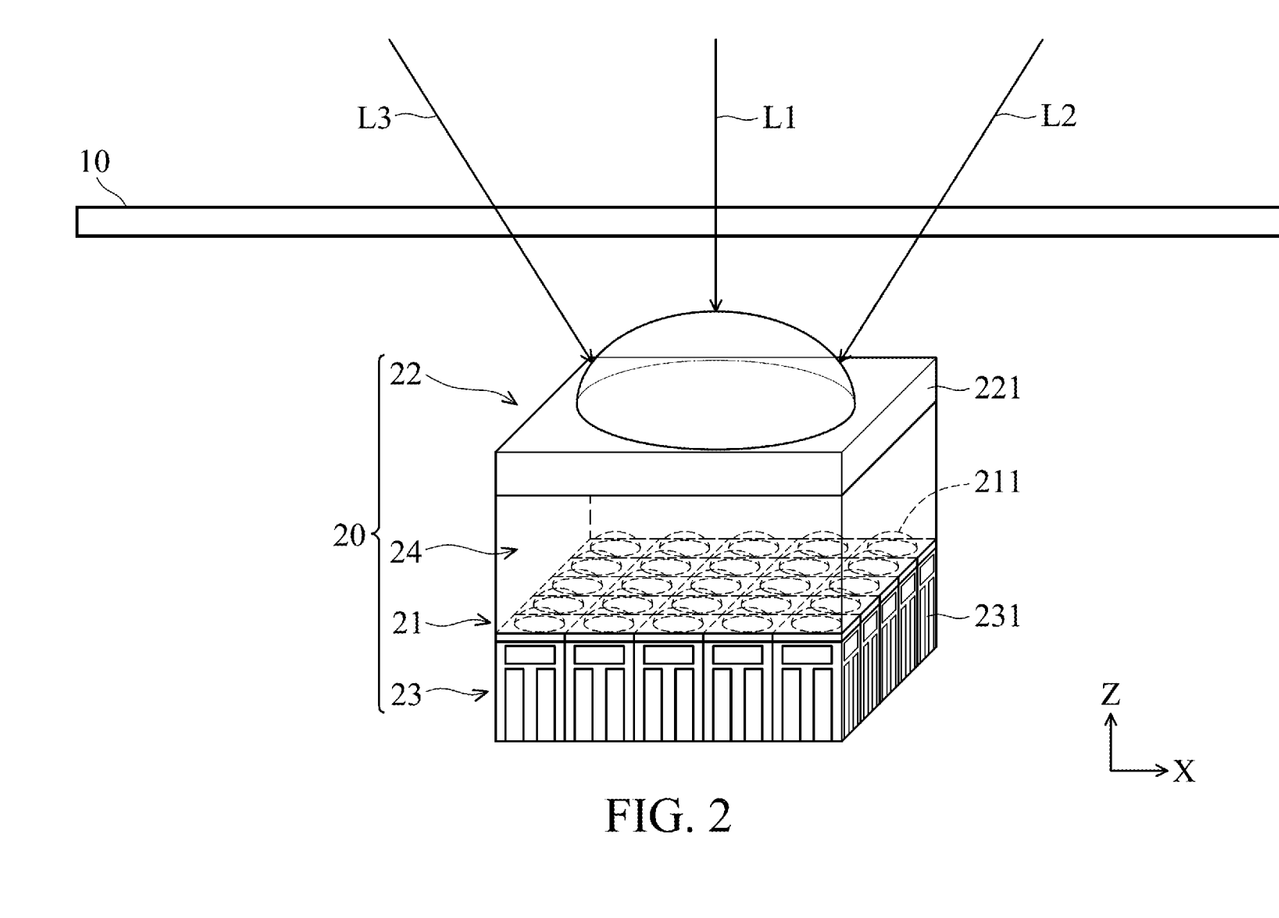
FIG. 2 shows a schematic view of a double-layer lens array CIS according to some embodiments of the present disclosure.

Please refer to FIG. 2, which shows a schematic view of the double-layer lens array CIS 20 according to some embodiments of the present disclosure. The double-layer lens array CIS 20 may include a first layer lens array 21, a second layer lens array 22, a sensor 23 and an intermediate layer 24. The second layer lens array 22 is disposed over the first layer lens array 21, and the sensor 23 is disposed below the first layer lens array 21. In other words, the first layer lens array 21 is disposed between the second layer lens array 22 and the sensor 23. The intermediate layer 24 is disposed between the first layer lens array 21 and the second layer lens array 22.

As shown in FIG. 2, in some embodiments, the first light L1, the second light L2 and the third light L3 passes through the display screen 10, the second layer lens array 22, the intermediate layer 24 and the first layer lens array 21 sequentially, and then reaches the sensor 23.

Figure 3A:
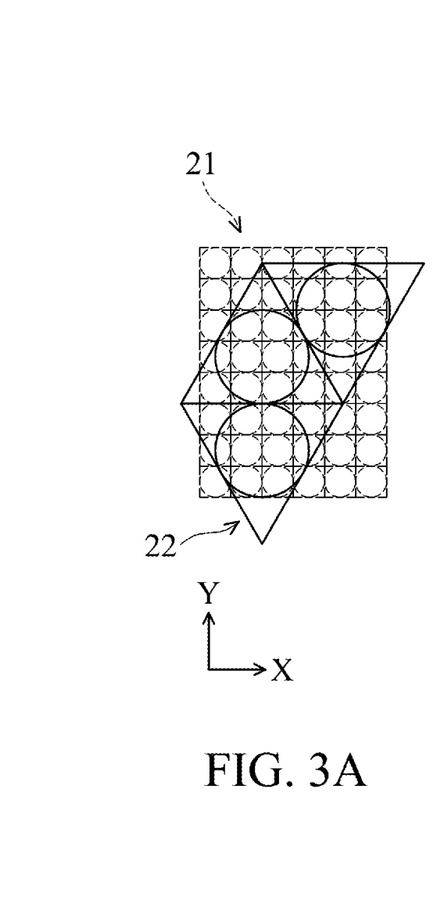
FIG. 3A, FIG. 3B and FIG. 3C show schematic views of a first layer lens array and a second layer lens allay according to some embodiments of the present disclosure.
Figure 3B:
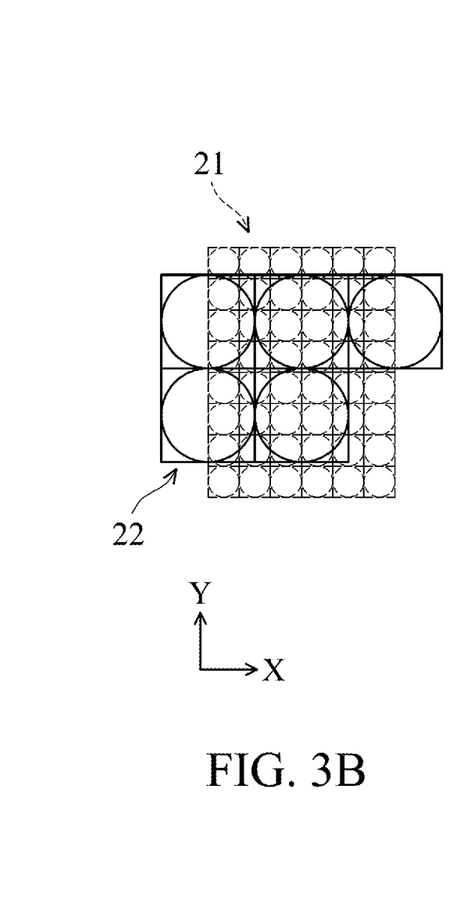
Figure 3C:
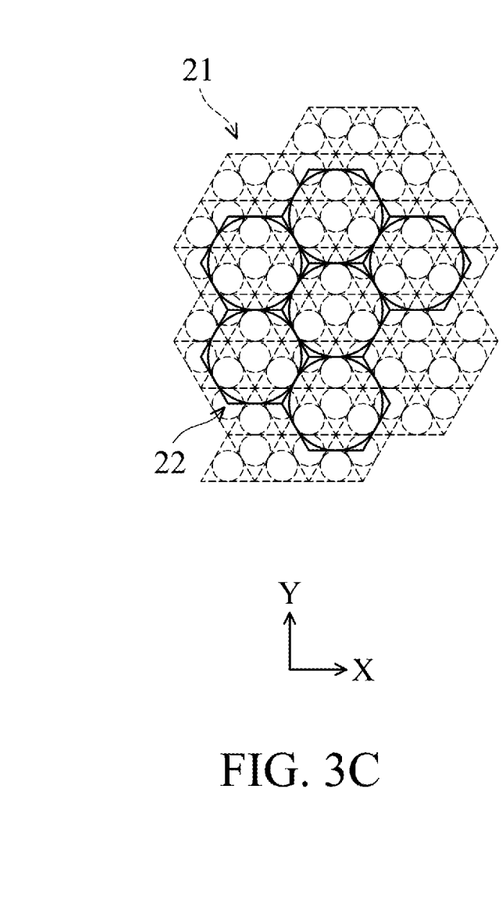

Please refer to FIG. 3A, FIG. 3B and FIG. 3C. FIG. 3A, FIG. 3B and FIG. 3C show schematic views of the first layer lens array 21 and the second layer lens array 22 according to some embodiments of the present disclosure. Although only one second layer lens 221 is shown in FIG. 2, the second layer lens array 22 may include a plurality of second layer lenses 221 (please refer to FIG. 3A, FIG. 3B and FIG. 3C). As shown in FIG. 2, FIG. 3A, FIG. 3B and FIG. 3C, the first layer lens array 21 may include a plurality of first layer lenses 211. The size of the second layer lens 221 is larger than the size of the first layer lens 211. In some embodiments, the size of the second layer lens 221 is greater than or equal to 3 times the size of the first layer lens 211. However, in some embodiments, an area of each one of the second layer lens 221 is smaller (or not larger) than 30% of the sensing area of the sensor 23. The sensing area of the sensor 23 may be defined as a total area of the sensor 23 that capable of sensing the lights (or images).

FIG. 3A, FIG. 3B and FIG. 3C show several exemplary embodiments of arrangements between the first layer lens array 21 and the second layer lens array 22. As shown in FIG. 3A, FIG. 3B and FIG. 3C, one second layer lenses 221 may corresponds to several first layer lenses 211. The arrangements between the first layer lens array 21 and the second layer lens array 22 may be in a triangle arrangement (FIG. 3A), a rectangle arrangement (FIG. 3B), a hexagon arrangement (FIG. 3C), or a polygon arrangement (not shown).

Please refer back to FIG. 2, the sensor 23 may include a plurality of pixels 231. In some embodiments, the size of each of the pixels 231 is equal to the size of each of the first layer lens 211.

Moreover, in some embodiments, the refractive index of the intermediate layer 24 may be equal to or greater than 1, and the refractive index of the intermediate layer 24 may be lower than the refractive index of the first layer lens array 21. In some embodiments, the refractive index of the intermediate layer 24 may be equal to or greater than 1, and the refractive index of the intermediate layer 24 may be equal to or lower than the refractive index of the second layer lens array 22.

In some embodiments, the refractive index of the first layer lens array 21 may be equal to the refractive index of the second layer lens array 22. In some embodiments, the refractive index of the first layer lens array 21 may not equal to the refractive index of the second layer lens array 22.

With the abovementioned configuration, the double-layer lens array CIS 20 allows the image processing system 100 to acquire the 4D plenoptic function (POF) for the incident lights with different wavelengths.

Figure 4A:
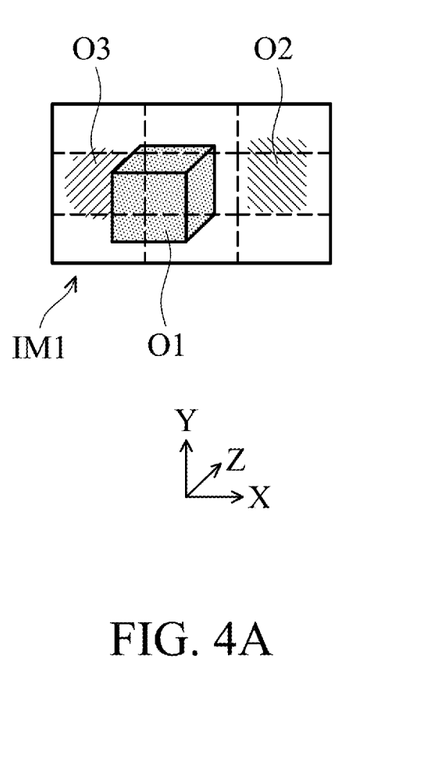
FIG. 4A, FIG. 4B and FIG. 4C show schematic views of a first image, a second image and a third image according to some embodiments of the present disclosure.
Figure 4B:
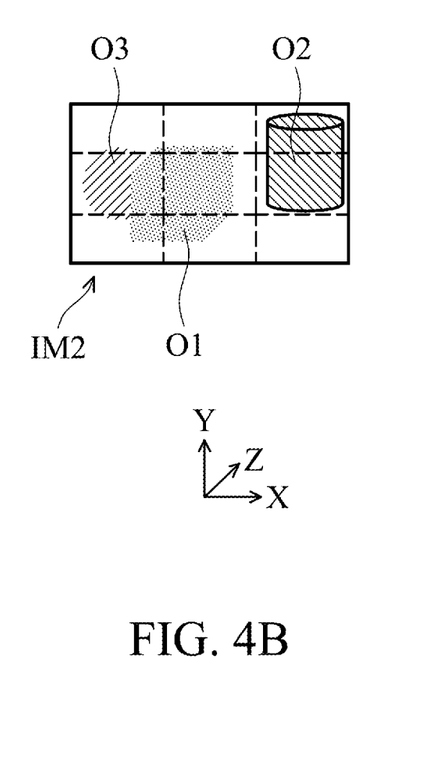
Figure 4C:
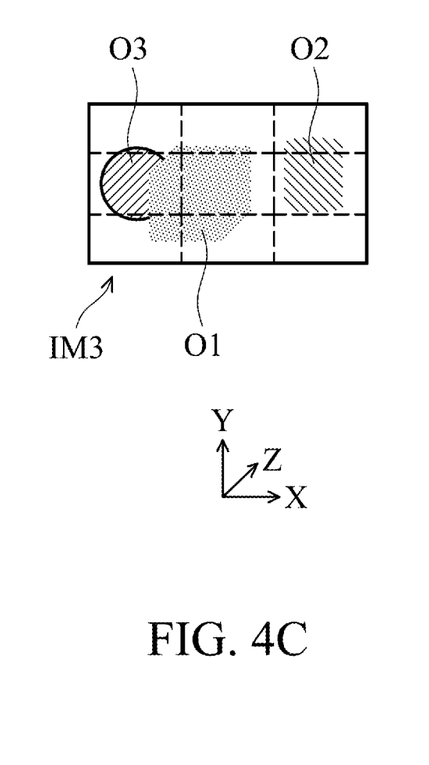

Please refer to FIG. 4A, FIG. 4B and FIG. 4C, which show schematic views of a first image IM1, a second image IM2 and a third image IM3 according to some embodiments of the present disclosure. The image processing system 100 may take a plurality of photos with the image processing system 100 focused at different depths. In the embodiments shown in FIG. 4A, FIG. 4B and FIG. 4C, the image processing system 100 may take three photos, which may be the first image IM1, the second image IM2 and the third image IM3.

FIG. 4A shows the first image IM1 obtained by the image processing system 100 focusing at the first depth D1. Specifically, the first image IM1 is generated by the double-layer lens array CIS 20 in response to the double-layer lens array CIS 20 receiving the first light L1. Since the first object O1 is away from the image processing system 100 by the first depth D1, and the first image IM1 is obtained by the image processing system 100 focusing at the first depth D1, the first object O1 in the first image IM1 is clear.

Figure 5A:
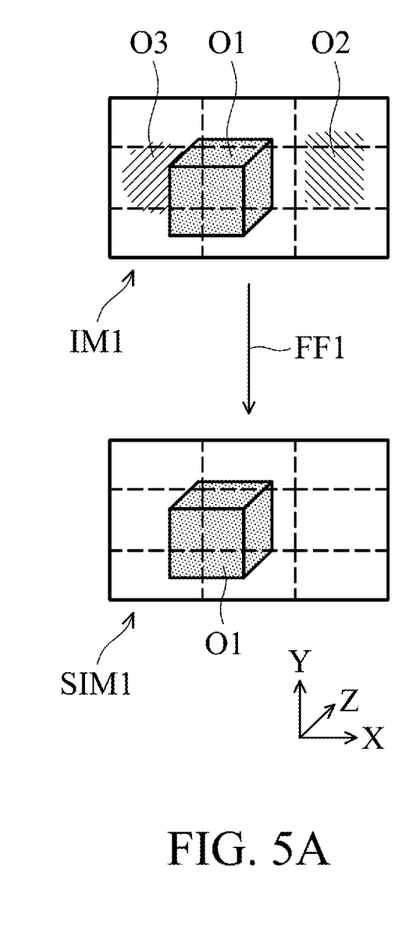
FIG. 5A, FIG. 5B and FIG. 5C show schematic views of processing the images according to some embodiments of the present disclosure.
Figure 5B:
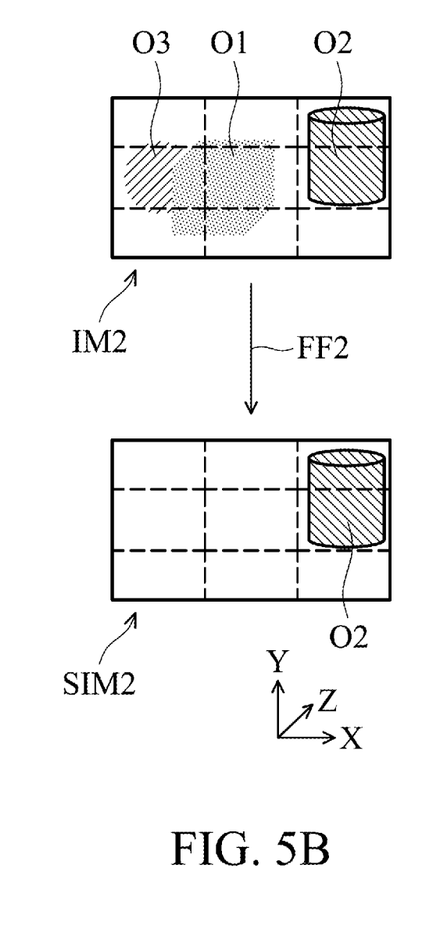
Figure 5C:
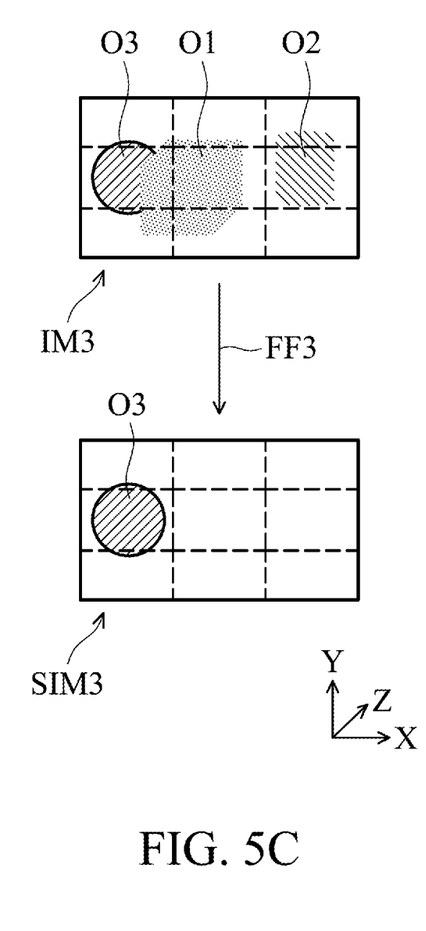

Please refer to FIG. 5A, FIG. 5B and FIG. 5C, which show schematic views of processing the images according to some embodiments of the present disclosure. The images obtained by the image processing system 100 may be processed by a filter function FF. The filter function FF may include a plurality of filter functions to process the images at different depths, and then sub-images are generated. In some embodiments, the filter function FF may include a first depth filter function FF1, a second depth filter function FF2 and a third depth filter function FF3. The first depth filter function FF1 is for processing the images obtained at the first depth D1, the second depth filter function FF2 is for processing the images obtained at the second depth D2, and the third depth filter function FF3 is for processing the images obtained at the third depth D3.

In FIG. 5A, the first image IM1 is processed by the first depth filter function FF1. The first depth filter function FF1 filters out the images that is not at the first depth D1, and a first sub-image SIM1 is remained. The first sub-image SIM1 is clear in the first image IM1, and the first sub-image SIM1 includes the image of the first object O1 since it is clear in the first image IM1. That is, the image (such as the images of the second object O2 and the third object O3) that is not clear in the first image IM1 is filtered out.

FIG. 4B shows the second image IM2 is obtained by the image processing system 100 focusing at the second depth D2. Specifically, the second image IM2 is generated by the double-layer lens array CIS 20 in response to the double-layer lens array CIS 20 receiving the second light L2. Since the second object O2 is away from the image processing system 100 by the second depth D2, and the second image IM2 is obtained by the image processing system 100 focusing at the second depth D2, the second object O2 in the second image IM2 is clear.

In FIG. 5B, the second image IM2 is then processed by the second depth filter function FF2. The second depth filter function FF2 filters out the images that is not at the second depth D2, and a second sub-image SIM2 is remained. The second sub-image SIM2 is clear in the second image IM2, and the second sub-image SIM2 includes the image of the second object O2 since it is clear in the second image IM2. That is, the image (such as the images of the first object O1 and the third object O3) that is not clear in the second image IM2 is filtered out.

FIG. 4C shows the third image IM3 is obtained by the image processing system 100 focusing at the third depth D3. Specifically, the third image IM3 is generated by the double-layer lens array CIS 20 in response to the double-layer lens array CIS 20 receiving the third light L3. Since the third object O3 is away from the image processing system 100 by the third depth D3, and the third image IM3 is obtained by the image processing system 100 focusing at the third depth D3, the third object O3 in the third image IM3 is clear.

In FIG. 5C, the third image IM3 is then processed by the third depth filter function FF3. The third depth filter function FF3 filters out the images that is not at the third depth D3, and a third sub-image SIM3 is remained. The third sub-image SIM3 is clear in the third image IM3, and the third sub-image SIM3 includes the image of the third object O3 since it is clear in the third image IM3. That is, the image (such as the images of the first object O1 and the second object O2) that is not clear in the third image IM3 is filtered out.

Figure 6:
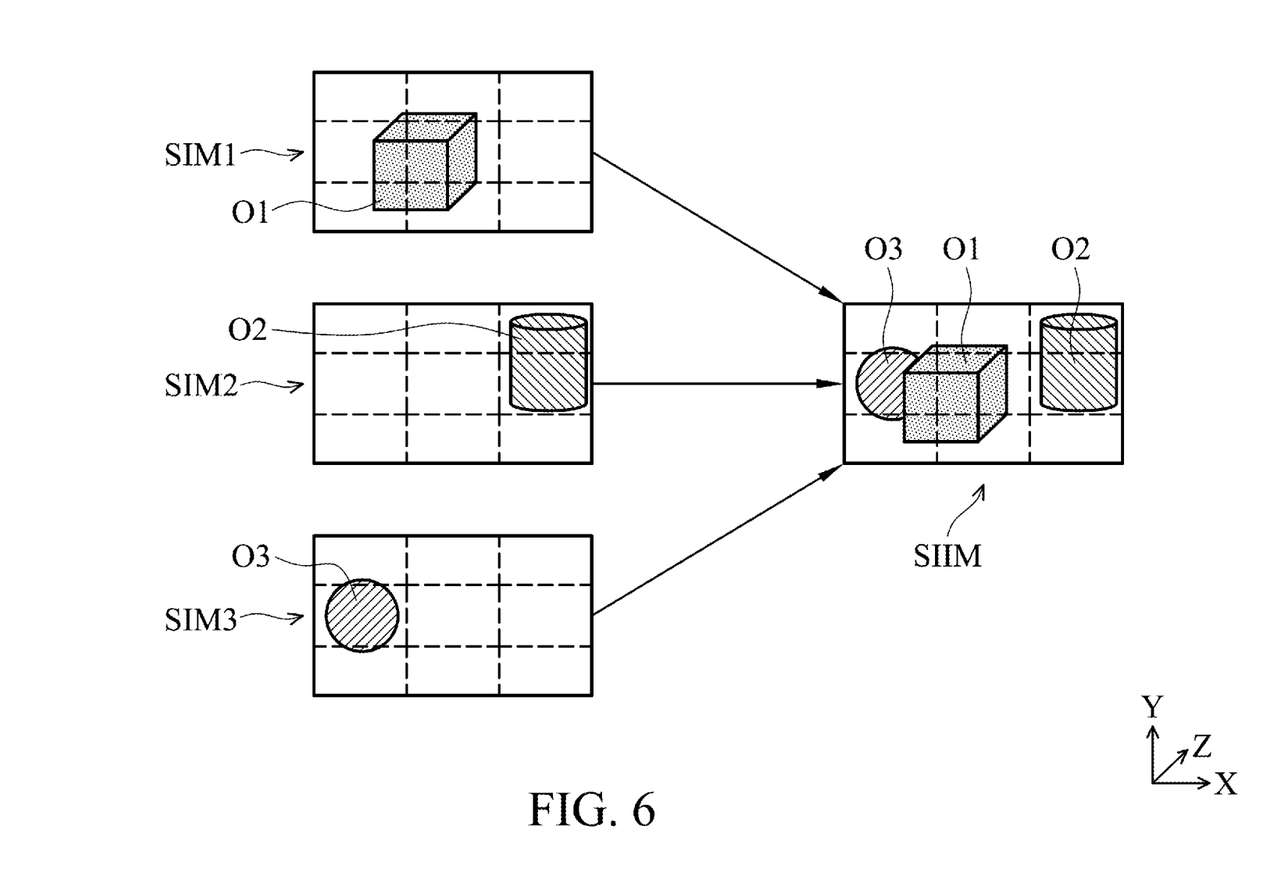
FIG. 6 shows a schematic view of superimposing a first sub-image, a second sub-image and a third sub-image according to some embodiments of the present disclosure.

Please refer to FIG. 6, which shows a schematic view of superimposing the first sub-image SIM1, the second sub-image SIM2 and the third sub-image SIM3 according to some embodiments of the present disclosure. Superimposing the first sub-image SIM1, the second sub-image SIM2 and the third sub-image SIM3 means that the first sub-image SIM1, the second sub-image SIM2 and the third sub-image SIM3 are "merged" in to a new image. As shown in FIG. 6, the first sub-image SIM1, the second sub-image SIM2 and the third sub-image SIM3 may be superimposed by the processor 30 into a superimposed image SIIM.

The superimposed image SIIM is clear at all depths since it is a combination of the first sub-image SIM1, the second sub-image SIM2 and the third sub-image SIM3. Moreover, in the superimposed image SIIM, the first object O1, the second object O2 and the third object O3 are clear.

Please note that the embodiments shown above are only examples, in some embodiments, the image processing system 100 needs not to obtain the third image IM3. That is, in some embodiments, the image processing system 100 only obtains the first image IM1 and the second image IM2 to generates the superimposed image SIIM.

The abovementioned image processing system 100 allows a clear superimposed image at all depths to be generated by processing the images at different depths. Moreover, the abovementioned image processing system 100 may solve the problems of image overlay and blurring caused by diffraction and interference effects after the lights pass through the display screen.

Figure 7A:
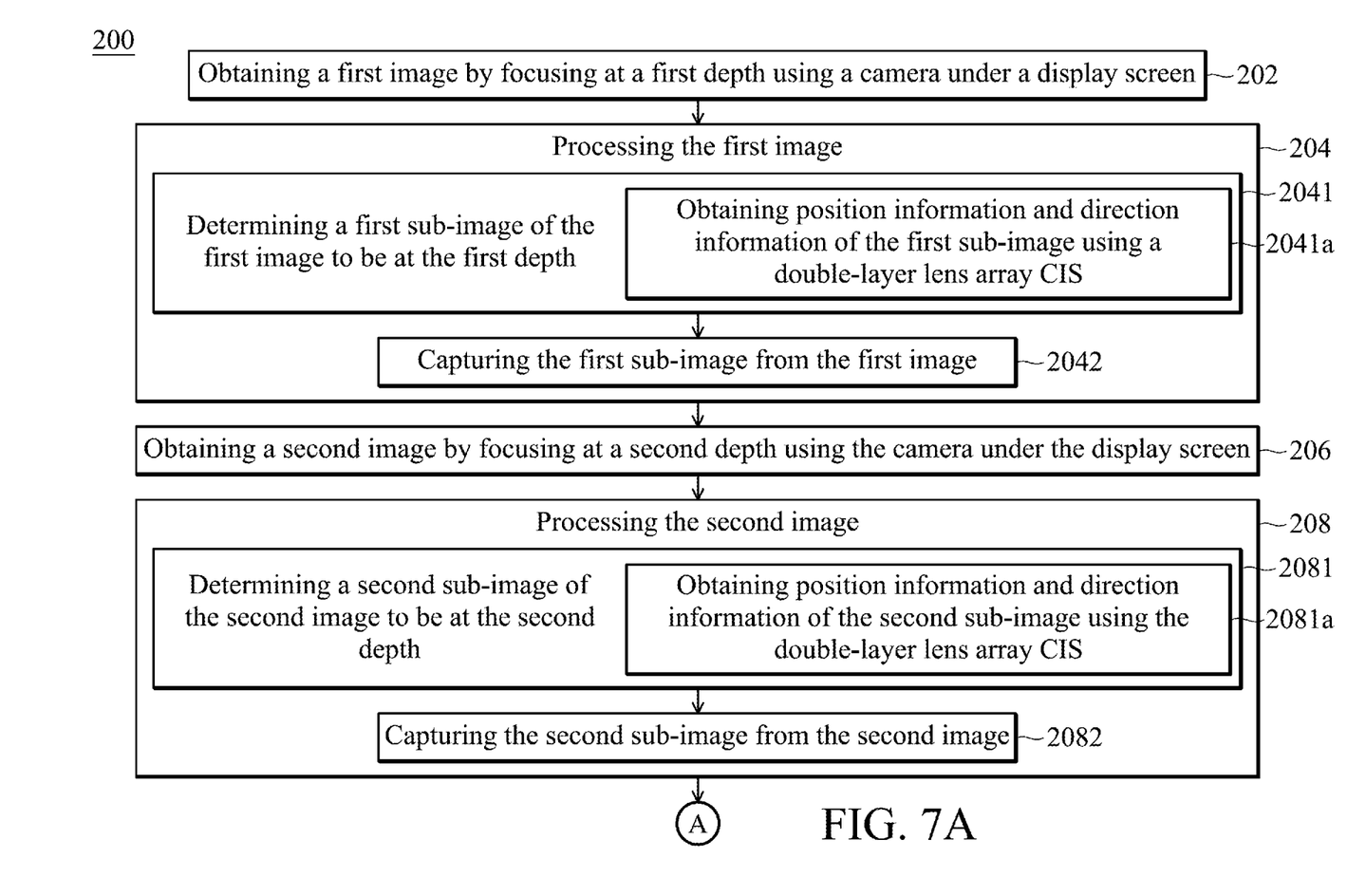
FIG. 7A and FIG. 7B show a flowchart of an image processing method according to some embodiments of the present disclosure.
Figure 7B:
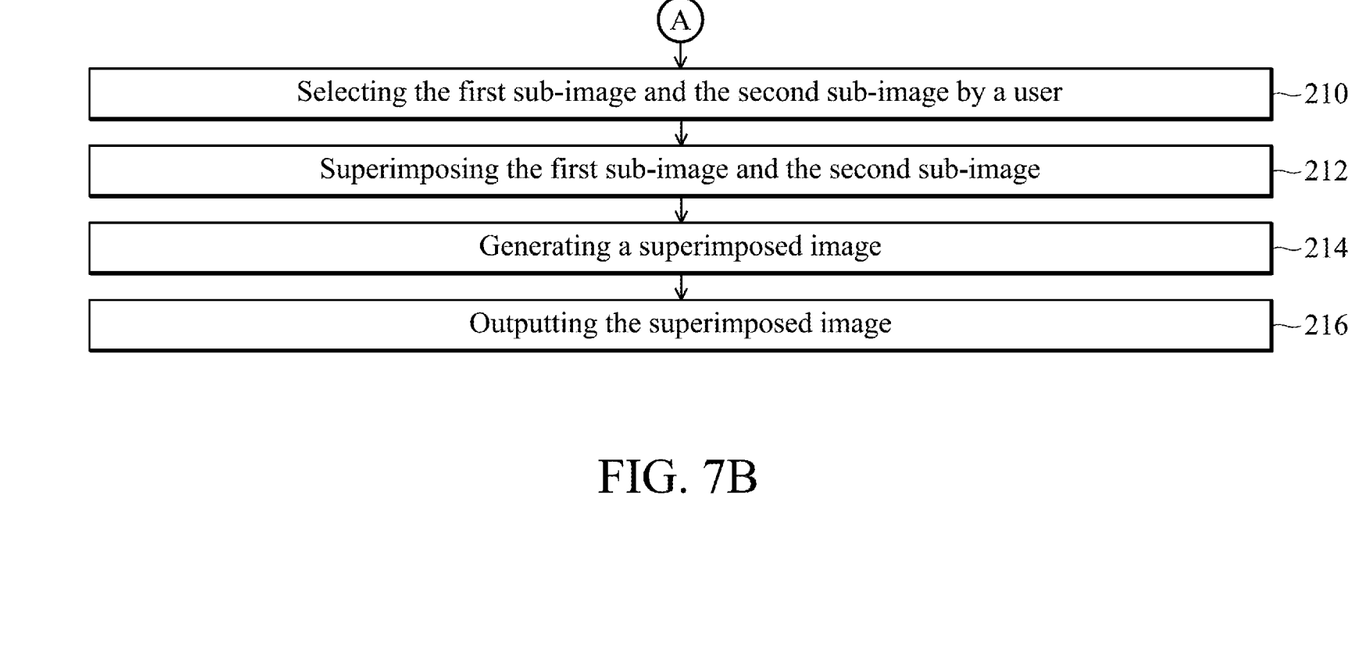

Please refer to FIG. 7A and FIG. 7B, which show a flowchart of an image processing method 200 according to some embodiments of the present disclosure. In some embodiments, the image processing method may start from step 202.

In step 202, the camera (the double-layer lens array CIS 20 and the processor 30) under the display screen 10 receives the first light L1, and the first image IM1 is obtained by focusing the camera at the first depth D1. The image processing method 200 then proceeds to step 204.

In step 204, the first image IM1 is processed by the processor 30. Step 204 may include step 2041 and step 2042. In step 2041, the first sub-image SIM1 of the first image IM1 is determined by the processor 30 to be at the first depth D1. Step 2041 may include step 2041a. In step 2041a, the position information and the direction information of the first sub-image SIM1 is obtained by the double-layer lens array CIS 20. In step 2042, the first sub-image SIM1 is captured from the first image IM1. The image processing method 200 then proceeds to step 206.

In step 206, the camera (the double-layer lens array CIS 20 and the processor 30) under the display screen 10 receives the second light L2, and the second image IM2 is obtained by focusing the camera at the second depth D2. The image processing method 200 then proceeds to step 208.

In step 208, the second image IM2 is processed by the processor 30. Step 208 may include step 2081 and step 2082. In step 2081, the second sub-image SIM2 of the second image IM2 is determined by the processor 30 to be at the second depth D2. Step 2081 may include step 2081a. In step 2081a, the position information and the direction information of the second sub-image SIM2 is obtained by the double-layer lens array CIS 20. In step 2082, the second sub-image SIM2 is captured from the second image IM2. The image processing method 200 then proceeds to step 210.

In step 210, the user selects the first sub-image SIM1 and the second sub-image SIM2. The image processing method 200 then proceeds to step 212.

In step 212, the first sub-image SIM1 and the second sub-image SIM 2 are superimposed by the processor 30. The image processing method 200 then proceeds to step 214.

In step 214, the superimposed image SIIM is generated by the processor 30 after the processor 30 superimposes the first sub-image SIM1 and the second sub-image SIM2. The image processing method 200 then proceeds to step 216.

In step 216, the superimposed image SIIM is output to the display screen 10.

Figure 8A:
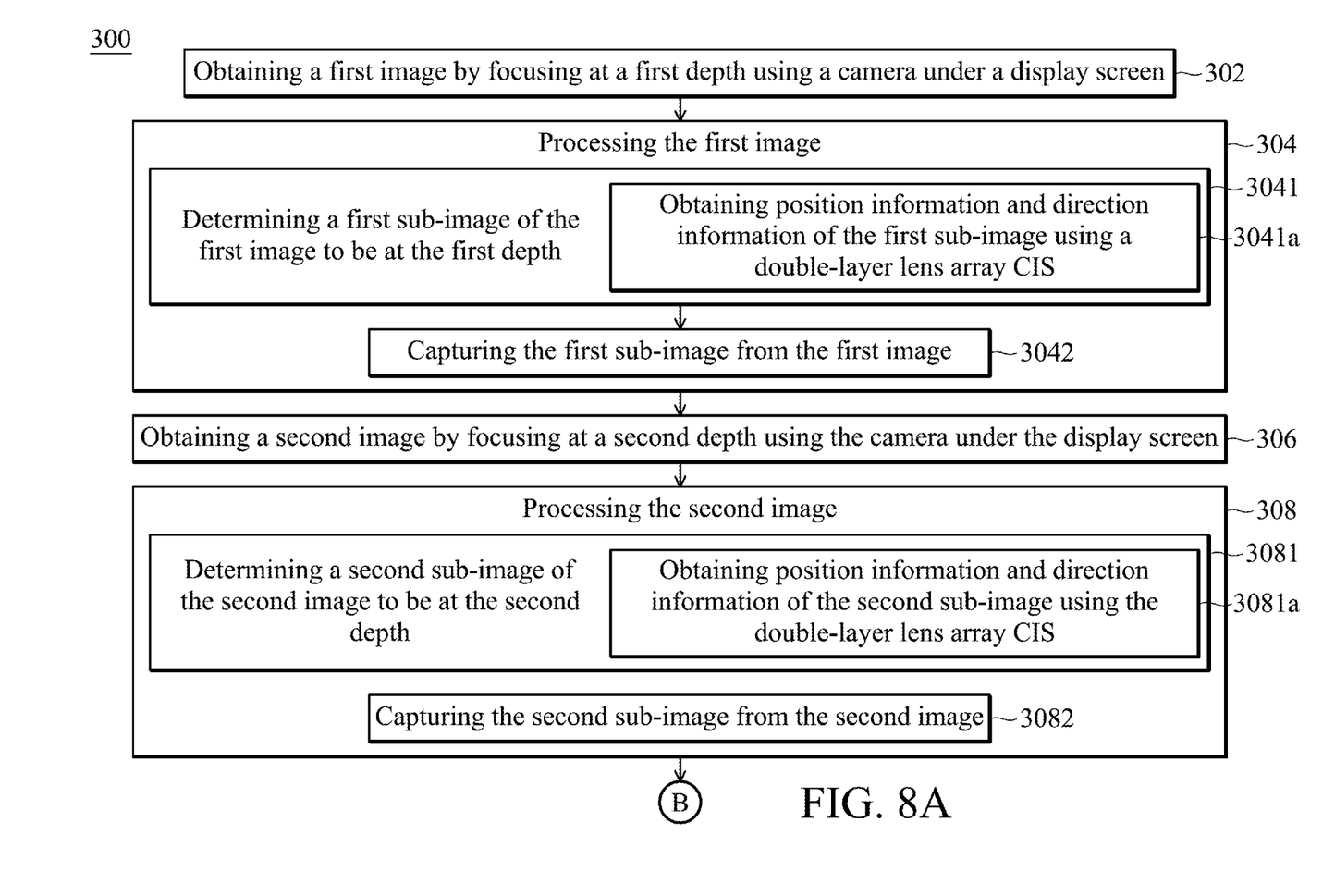
FIG. 8A and FIG. 8B show a flowchart of another image processing method according to some embodiments of the present disclosure.
Figure 8B:
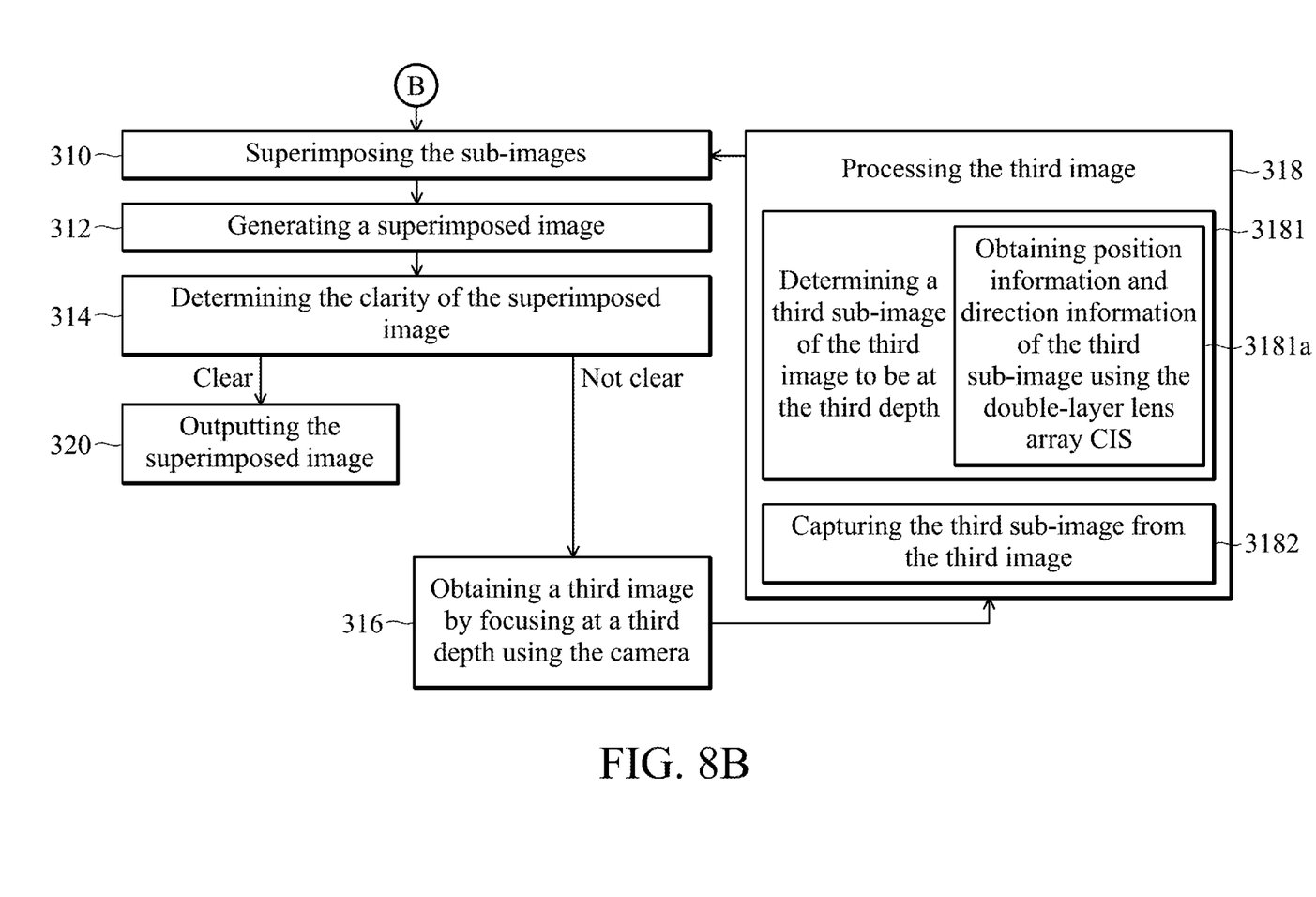

Please refer to FIG. 8A and FIG. 8B, which show a flowchart of an image processing method 300 according to some embodiments of the present disclosure. In some embodiments, the image processing method may start from step 302.

In step 302, the camera (the double-layer lens array CIS 20 and the processor 30) under the display screen 10 receives the first light L1, and the first image IM1 is obtained by focusing the camera at the first depth D1. The image processing method 300 then proceeds to step 304.

In step 304, the first image IM1 is processed by the processor 30. Step 304 may include step 3041 and step 3042. In step 3041, the first sub-image SIM1 of the first image IM1 is determined by the processor 30 to be at the first depth D1. Step 3041 may include step 3041a. In step 3041a, the position information and the direction information of the first sub-image SIM1 is obtained by the double-layer lens array CIS 20. In step 3042, the first sub-image SIM1 is captured by the processor 30 from the first image IM1. The image processing method 300 then proceeds to step 306.

In step 306, the camera (the double-layer lens array CIS 20 and the processor 30) under the display screen 10 receives the second light L2, and the second image IM2 is obtained by focusing the camera at the second depth D2. The image processing method 300 then proceeds to step 308.

In step 308, the second image IM2 is processed by the processor 30. Step 308 may include step 3081 and step 3082. In step 3081, the second sub-image SIM2 of the second image IM2 is determined by the processor 30 to be at the second depth D2. Step 3081 may include step 3081a. In step 3081a, the position information and the direction information of the second sub-image SIM2 is obtained by the double-layer lens array CIS 20. In step 3082, the second sub-image SIM2 is captured by the processor 30 from the second image IM2. The image processing method 300 then proceeds to step 310.

In step 310, the sub-images (may include the first sub-image SIM1 and the second sub-image SIM 2) are superimposed by the processor 30. The image processing method 300 then proceeds to step 312.

In step 312, the superimposed image SIIM is generated by the processor 30 after the processor 30 superimposes the first sub-image SIM1 and the second sub-image SIM2. The image processing method 300 then proceeds to step 314.

In step 314, the clarity of the superimposed image SIIM is determined by the processor 30. The image processing method 300 then proceeds to step 316 if the superimposed image SIIM is determined to be unclear. The image processing method 300 then proceeds to step 320 if the superimposed image SIIM is determined to be unclear.

In step 316, the camera (the double-layer lens array CIS 20 and the processor 30) under the display screen 10 receives the third light L3, and the third image IM3 is obtained by focusing the camera at the third depth D3. The third depth D3 is different than the first depth D1 and the second depth D2. In some embodiments, the third depth D3 is between the first depth D1 and the second depth D2. The image processing method 300 then proceeds to step 318.

In step 318, the third image IM3 is processed by the processor 30. Step 318 may include step 3181 and step 3182. In step 3181, the third sub-image SIM3 of the third image IM3 is determined by the processor 30 to be at the third depth D3. Step 3181 may include step 3181a. In step 3181a, the position information and the direction information of the third sub-image SIM3 is obtained by the double-layer lens array CIS 20. In step 3182, the third sub-image SIM3 is captured by the processor 30 from the third image IM3. The image processing method 300 then proceeds to step 320. The image processing method 300 then back to step 310.

Please note that steps 310-318 may be repeated several times and a plurality of sub-images may be captured for the purpose of generating a clear superimposed image.

In step 320, the superimposed image SIIM is output to the display screen 10.

It should be noted that the sequence of the steps are changeable. For example, step 206 may be performed before step 204, or step 306 may be performed before step 304.

The abovementioned image processing method 200 and image processing method 300 allows a clear superimposed image at all depths to be generated by processing images with different depths. Moreover, the abovementioned image processing method 200 and image processing method 300 may solve the problems with image overlay and blurring caused by diffraction and interference effects after the lights pass through the display screen.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, comprising:
   obtaining a first image using a camera under a display screen;
   processing the first image using a processor, comprising:
      determining a first sub-image of the first image and capturing the first sub-image from the first image, wherein the first sub-image is a sub-image of the first image that has a first depth;
   obtaining a second image using the camera under the display screen;
   processing the second image using the processor, comprising:
      determining a second sub-image of the second image and capturing the second sub-image from the second image, wherein the second sub-image is a sub-image of the second image that has a second depth; superimposing the first sub-image and the second sub-image; and
   generating a superimposed image after superimposing the first sub-image and the second sub-image,
   wherein the first depth is different than the second depth.

2. The image processing method as claim in claim 1, wherein the step of determining the first sub-image comprises:
      obtaining position informations and direction informations of the first image using a double-layer lens array CIS;
      determining a plurality of depths of a plurality of sub-images of the first image; and
      selecting the first depth and obtaining the first sub-image,
   wherein the step of determining the second sub-image comprises:
      obtaining position informations and direction informations of the second image using the double-layer lens array CIS;
      determining a plurality of depths of a plurality of sub-images of the second image; and
      selecting the second depth and obtaining the second sub-image.

3. The image processing method as claim in claim 1, further comprising:
   selecting the first sub-image and the second sub-image by a user before they are superimposing; and
   outputting the superimposed image after the superimposed image is generated.

4. The image processing method as claim in claim 1, further comprising:
   determining the clarity of the superimposed image using the processor.

5. The image processing method as claim in claim 4, further comprising:
   outputting the superimposed image in response to a determination that the superimposed image is clear.

6. The image processing method as claim in claim 5, further comprising:
   obtaining a third image using the camera under the display screen in response to a determination that the superimposed image is unclear.

7. The image processing method as claim in claim 6, further comprising:
   processing the third image using the processor, comprising:
      determining a third sub-image of the third image and capturing the third sub-image from the third image using the processor, wherein the third sub-image has a third depth that is different from the first depth and the second depth.

8. The image processing method as claim in claim 7, wherein the step of superimposing comprises:
   superimposing the first sub-image, the second sub-image and the third sub-image.

9. The image processing method as claim in claim 7, wherein the third depth is between the first depth and the second depth.

10. An image processing system, comprising:
    a display screen;
    a double-layer lens array CIS, disposed below the display screen, configured to receive a first light and a second light; and
    a processor,
    wherein in response to receiving the first light, the double-layer lens array CIS generates a first image, wherein in response to receiving the second light, the double-layer lens array CIS generates a second image,
    wherein the processor is configured to superimpose a first sub-image of the first image and a second sub-image of the second image to generate a superimposed image, wherein the first sub-image is a sub-image of the first image that has a first depth,
wherein the second sub-image is a sub-image of the second image that has a second depth,
wherein the first depth is different than the second depth.

11. The image processing system as claimed in claim 10, wherein the double-layer lens array CIS comprises:
   a first layer lens array, comprising a plurality of first layer lenses;
   a second layer lens array, disposed over the first layer lens array comprising a plurality of second layer lenses; and
   a sensor, comprising a plurality of pixels;
wherein the size of each of the first layer lenses is equal to the size of each of the pixels,
wherein the size of each of the second layer lenses is greater than or equal to 3 times the size of each of the pixels.

12. The image processing system as claimed in claim 11, wherein the first light and the second light pass through the display screen, the second layer lens array and the first layer lens array and then reaches the sensor,
wherein an area of each one of the second layer lens is smaller than 30% of a sensing area of the sensor.

13. The image processing system as claimed in claim 11, wherein the arrangements between the first layer lens array and the second layer lens array may be in a triangle arrangement, a rectangle arrangement, a hexagon arrangement, or a polygon arrangement.

14. The image processing system as claimed in claim 10, wherein the first sub-image is captured from the first image by the processor, and the second sub-image is captured from the second image is captured by the processor for superimposing.

15. The image processing system as claimed in claim 10, wherein the clarity of the superimposed image is determined by the processor.

16. The image processing system as claimed in claim 15, wherein the double-layer lens array CIS receive a third light in response to a determination that the superimposed image is unclear,
wherein in response to receiving the third light, the double-layer lens array CIS generates a third image,
wherein the processor is configured to superimpose the first sub-image, the second sub-image and a third sub-image of the third image to generate a superimposed image,
the third sub-image is a sub-image of the third image that has a third depth,
wherein the third depth is different than the first depth and the second depth.

17. The image processing system as claimed in claim 16, wherein the display screen outputs the superimposed image in response to a determination that the superimposed image is clear.

18. The image processing system as claimed in claim 16, wherein the third depth is between the first depth and the second depth.

19. The image processing system as claimed in claim 10, wherein the first sub-image and the second sub-image for superimposing are selected by a user,
wherein the display screen outputs the superimposed image.

20. The image processing system as claimed in claim 10, wherein the image of a first object is clear in the first image, and the image of a second object is clear in the second image,
wherein the image of the first object is not clear in the second image, and the image of the second object is not clear in the first image,
wherein the first object is the first depth away from the image processing system,
wherein the second object is the second depth away from the image processing system.

* * * * *